(12) United States Patent
Binek et al.

(10) Patent No.: US 11,732,610 B2
(45) Date of Patent: Aug. 22, 2023

(54) SECTIONED ENGINE STRUCTURE FOR A GAS TURBINE ENGINE

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/535,078

(22) Filed: Nov. 24, 2021

(65) Prior Publication Data
US 2023/0160323 A1 May 25, 2023

(51) Int. Cl.
*F01D 9/02* (2006.01)
*F01D 25/24* (2006.01)
*F02C 7/22* (2006.01)
*F23R 3/00* (2006.01)

(52) U.S. Cl.
CPC .............. *F01D 25/24* (2013.01); *F01D 9/02* (2013.01); *F02C 7/222* (2013.01); *F23R 3/002* (2013.01); *F05D 2220/32* (2013.01); *F05D 2230/60* (2013.01); *F05D 2240/12* (2013.01); *F05D 2240/128* (2013.01); *F05D 2240/14* (2013.01); *F05D 2240/35* (2013.01)

(58) Field of Classification Search
CPC . F01D 25/24; F01D 9/02; F02C 7/222; F05D 2220/32; F05D 2230/60; F05D 2240/12; F05D 2240/128; F05D 2240/14; F05D 2240/35
See application file for complete search history.

(56) References Cited

U.S. PATENT DOCUMENTS

| | | | | | |
|---|---|---|---|---|---|
| 4,038,815 | A | * | 8/1977 | Heitmann | F23R 3/38 60/726 |
| 4,490,622 | A | * | 12/1984 | Osborn | F02B 37/24 417/406 |
| 4,743,776 | A | * | 5/1988 | Baehler | F02N 11/04 290/22 |
| 4,825,640 | A | * | 5/1989 | Shekleton | F23R 3/32 60/752 |
| 5,237,817 | A | * | 8/1993 | Bornemisza | F02C 3/05 415/196 |

(Continued)

OTHER PUBLICATIONS

EP search report for EP22209452.6 dated Apr. 5, 2023.

*Primary Examiner* — David E Sosnowski
*Assistant Examiner* — Theodore C Ribadeneyra
(74) *Attorney, Agent, or Firm* — Getz Balich LLC

(57) ABSTRACT

An assembly is provided for a gas turbine engine. This gas turbine engine assembly includes a stationary engine structure. The stationary engine structure includes a diffuser, a combustor, an engine case and a plenum. The combustor is disposed within the plenum. The engine case forms a peripheral boundary of the plenum. A gas path extends sequentially through the diffuser, the plenum and the combustor. A first section of the stationary engine structure is formed as a first monolithic body. The first section includes the diffuser and the combustor. A second section of the stationary structure is formed as a second monolithic body. The second section is configured as or otherwise includes the engine case.

16 Claims, 8 Drawing Sheets

(56) References Cited

U.S. PATENT DOCUMENTS

| | | | | |
|---|---|---|---|---|
| 5,577,380 | A * | 11/1996 | Shekleton | C08G 81/00 60/804 |
| 5,727,378 | A * | 3/1998 | Seymour | F01D 25/125 60/738 |
| 7,194,866 | B1 | 3/2007 | Jones | |
| 9,163,525 | B2 * | 10/2015 | Alexander | F01D 21/045 |
| 11,262,077 | B2 * | 3/2022 | Binek | F23R 3/045 |
| 2015/0345330 | A1 * | 12/2015 | Budnick | F01D 25/24 415/177 |
| 2016/0024952 | A1 * | 1/2016 | Farah | F02C 7/28 415/208.1 |
| 2017/0023249 | A1 | 1/2017 | Sreekanth | |
| 2018/0274780 | A1 | 9/2018 | Kim | |
| 2018/0355760 | A1 | 12/2018 | Kerns | |
| 2018/0363555 | A1 | 12/2018 | Zelina | |
| 2020/0011203 | A1 * | 1/2020 | Prabhakar | F01D 25/005 |
| 2020/0109663 | A1 | 4/2020 | Binek | |
| 2020/0123919 | A1 | 4/2020 | Hall | |
| 2020/0132306 | A1 | 4/2020 | Hock | |
| 2020/0182467 | A1 * | 6/2020 | Binek | B33Y 80/00 |
| 2020/0362724 | A1 | 11/2020 | Binek | |
| 2021/0088217 | A1 | 3/2021 | Binek | |
| 2021/0156564 | A1 | 5/2021 | Prociw | |

* cited by examiner

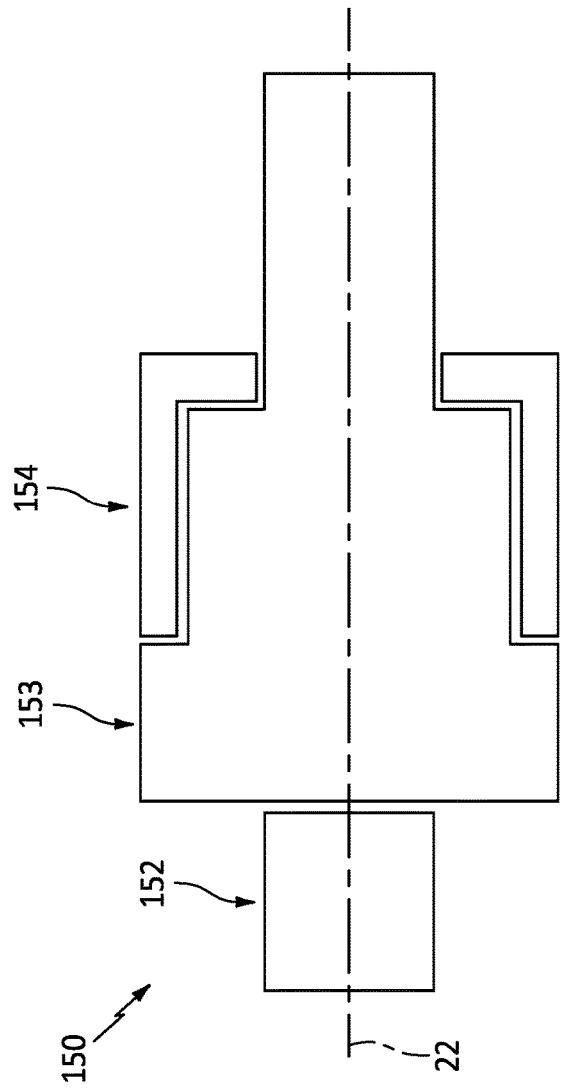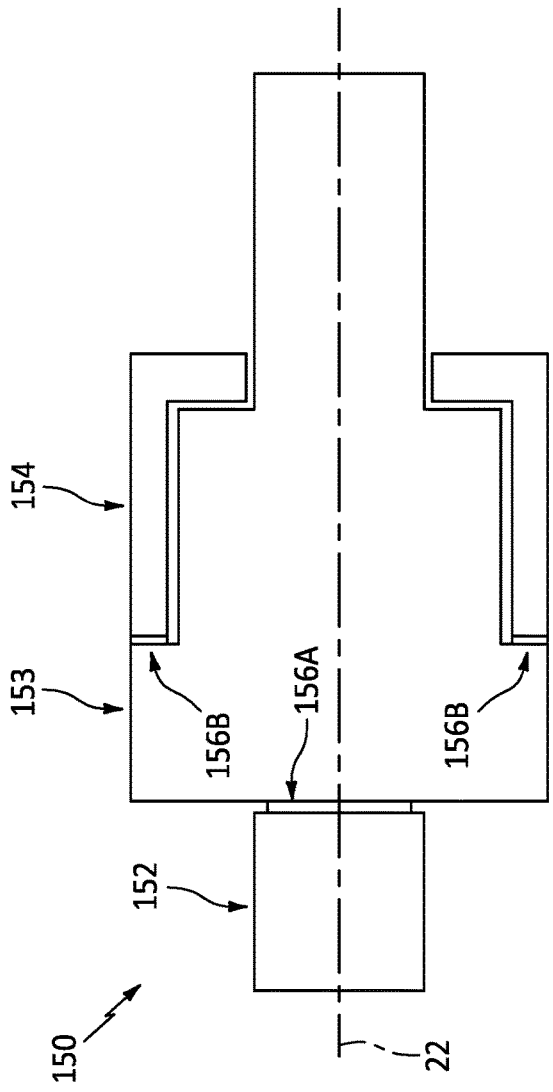

SECTIONED ENGINE STRUCTURE FOR A GAS TURBINE ENGINE

BACKGROUND OF THE DISCLOSURE

1. Technical Field

This disclosure relates generally to a gas turbine engine and, more particularly, to a stationary structure for the gas turbine engine.

2. Background Information

A gas turbine engine includes a stationary engine structure for housing and/or supporting internal rotating components of the gas turbine engine. A typical stationary engine structure includes a plurality of tubular axial case segments. These tubular axial case segments are arranged sequentially along an axial centerline of the gas turbine engine and axially connected together by flange connections. While such a stationary engine structure has various benefits, there is still room in the art for improvement. There is a need in the art therefore for an improved stationary engine structure as well as methods for manufacturing and assembling stationary engine structure components.

SUMMARY OF THE DISCLOSURE

According to an aspect of the present disclosure, an assembly is provided for a gas turbine engine. This gas turbine engine assembly includes a stationary engine structure. The stationary engine structure includes a diffuser, a combustor, an engine case and a plenum. The combustor is disposed within the plenum. The engine case forms a peripheral boundary of the plenum. A gas path extends sequentially through the diffuser, the plenum and the combustor. A first section of the stationary engine structure is formed as a first monolithic body. The first section includes the diffuser and the combustor. A second section of the stationary structure is formed as a second monolithic body. The second section is configured as or otherwise includes the engine case.

According to another aspect of the present disclosure, another assembly is provided for a gas turbine engine. This gas turbine engine assembly includes a diffuser, a combustor, a duct wall and an engine wall. The diffuser includes an inner diffuser wall and an outer diffuser wall. The combustor includes an inner combustor wall, an outer combustor wall and a bulkhead extending between and connected to the inner combustor wall and the outer combustor wall. The engine wall includes a side wall and an end wall. The side wall projects out from the end wall to the outer diffuser wall. The side wall is brazed to the outer diffuser wall. The end wall projects out from the side wall to the duct wall. The end wall is brazed to the duct wall.

According to still another aspect of the present disclosure, a manufacturing method is provided. During this method, an engine structure preform is formed. The engine structure preform includes a first section preform and a second section preform formed integral with the first section preform. The first section preform includes a diffuser and a combustor. The second section preform is configured as or otherwise includes an engine case. The first section preform is separated from the second section preform to respectively provide a first section and a second section that is discrete from the first section. The second section is attached to the first section to provide an engine structure. The combustor is disposed within a plenum of the engine structure. The engine case forms a peripheral boundary of the plenum. A gas path extends sequentially through the diffuser, the plenum and the combustor.

The forming may include additive manufacturing the engine structure preform. In addition or alternatively, the attaching may include bonding the second section to the first section.

The assembly may include a monolithic body including the diffuser, the combustor and the duct wall.

The diffuser may include a first wall, a second wall and a plurality of vanes. Each of the vanes may be within the gas path and may extend between the first wall and the second wall.

The combustor may be configured as a reverse-flow combustor.

The stationary engine structure may also include a turbine nozzle downstream of the combustor along the gas path. The first section may include the turbine nozzle.

The diffuser and the turbine nozzle may share a common wall.

The turbine nozzle may include a first wall, a second wall and a plurality of vanes. Each of the vanes may be within the gas path and may extend between the first wall and the second wall.

The assembly may also include a turbine rotor. The stationary engine structure may also include a turbine case housing the turbine rotor and forming a peripheral boundary of the gas path. The first section may also include the turbine case.

The stationary engine structure may also include an exhaust duct forming a peripheral boundary of the gas path. The first section may also include the exhaust duct.

The second section may circumscribe the first section.

The second section may be bonded to the first section through a butt joint.

The second section may be bonded to the first section through a splice joint.

The engine case may extend axially along and circumferentially about an axis. The engine case may include a side wall and an end wall. The side wall may project axially out from the end wall to an axial end of the engine case. The engine case may be attached to the first section at the axial end. The end wall may project radially in from the side wall to a radial end of the engine case. The engine case may be attached to the first section at the radial end.

The stationary engine structure may also include a fuel conduit and a nozzle. The nozzle may be configured to receive fuel from the fuel conduit and inject the fuel into a volume of the combustor. The second section may also include the fuel conduit and/or the nozzle.

The stationary structure may also include a fuel manifold outside of the engine case. The fuel manifold may be configured to supply the fuel to the fuel conduit. The second section may also include the fuel manifold.

At least a portion of the fuel conduit may project out from the engine case into the plenum towards the fuel injector.

The stationary engine structure may also include an inlet section and a compressor case. The compressor case may form a peripheral boundary of the gas path between the inlet section and the diffuser. A third section of the stationary structure may include the inlet section and the compressor case. The third section may be attached to the first section.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 8A and 8B are schematic illustrations of various preforms of the stationary engine structure.

DETAILED DESCRIPTION

Figure 1:
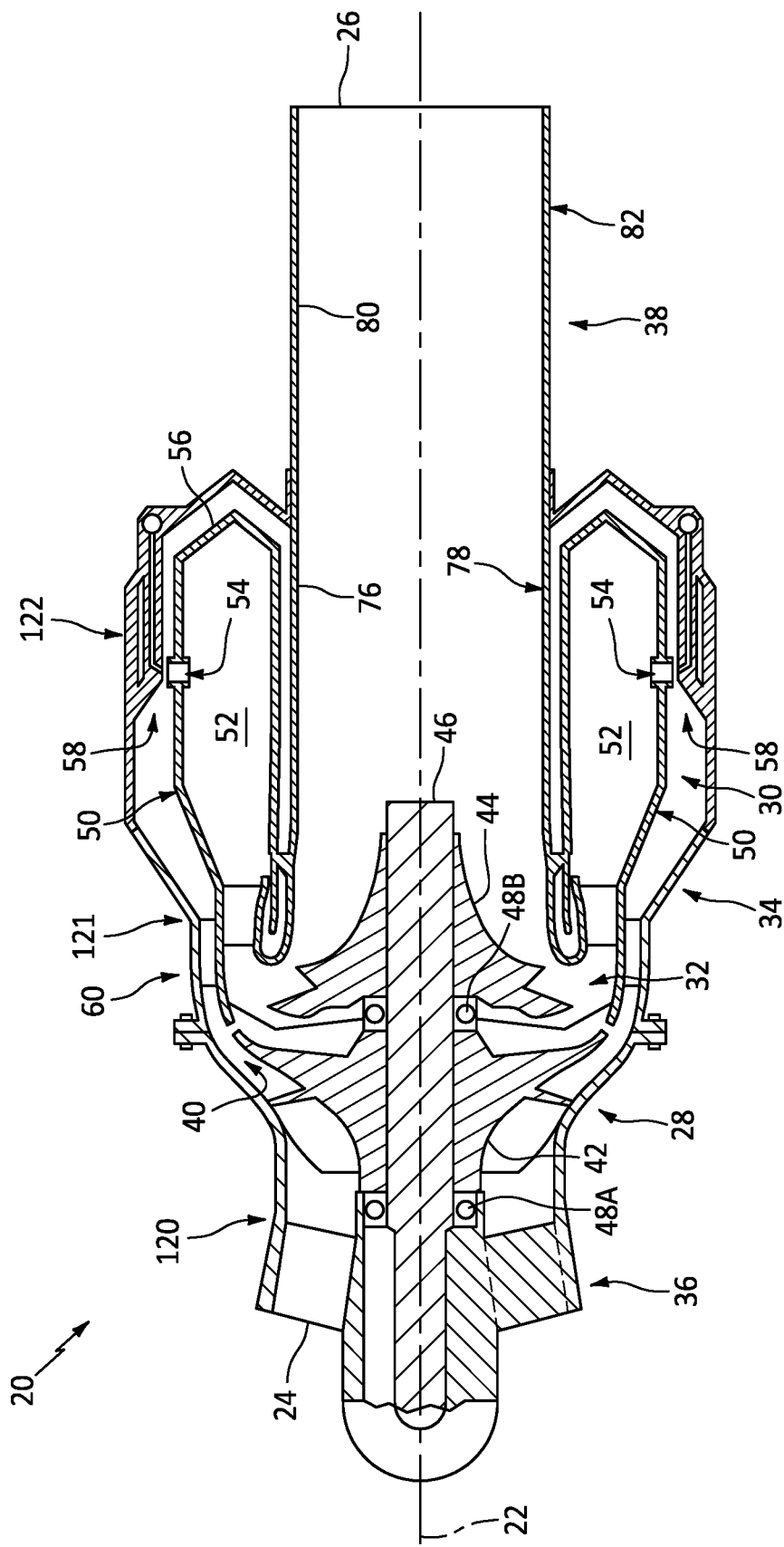
FIG. 1 is a schematic side sectional illustration of a gas turbine engine.

FIG. 1 is a side sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an exemplary turbojet turbine engine configuration nor to an aircraft propulsion system application. For example, the gas turbine engine 20 may alternatively be configured as an auxiliary power unit (APU) or an industrial gas turbine engine.

The gas turbine engine 20 of FIG. 1 extends axially along an axial centerline 22 between a forward, upstream engine inlet 24 and an aft, downstream engine exhaust 26. This axial centerline 22 may also be a rotational axis for various components within the gas turbine engine 20.

The gas turbine engine 20 includes a compressor section 28, a combustor section 30 and a turbine section 32. The gas turbine engine 20 also includes a stationary engine structure 34. This stationary engine structure 34 houses the compressor section 28, the combustor section 30 and the turbine section 32. The stationary engine structure 34 of FIG. 1 also forms an inlet section 36 and an exhaust section 38 for the gas turbine engine 20, where the inlet section 36 forms the engine inlet 24 and the exhaust section 38 forms the engine exhaust 26.

The engine sections 36, 28, 30, 32 and 38 are arranged sequentially along a core gas path 40 that extends through the gas turbine engine 20 from the engine inlet 24 to the engine exhaust 26. Each of the engine sections 28 and 32 includes a respective rotor 42, 44. Each of these rotors 42, 44 includes a plurality of rotor blades arranged circumferentially around and connected to at least one respective rotor disk. The rotor blades, for example, may be formed integral with or mechanically fastened, welded, brazed, adhered and/or otherwise attached to the respective rotor disk(s).

The compressor rotor 42 may be configured as a radial flow rotor. The turbine rotor 44 may also or alternatively be configured as a radial flow rotor. The compressor rotor 42 is connected to the turbine rotor 44 through an engine shaft 46. This shaft 46 is rotatably supported by the stationary engine structure 34 through a plurality of bearings 48A and 48B (generally referred to as 48); e.g., rolling element bearings, journal bearings, etc.

The combustor section 30 includes an annular combustor 50 with an annular combustion chamber 52. The combustor 50 of FIG. 1 is configured as a reverse flow combustor. Inlets ports 54 (e.g., dilution chutes) into the combustion chamber 52, for example, may be arranged at (e.g., on, adjacent or proximate) and/or towards an aft bulkhead wall 56 (e.g., bulkhead, dome, etc.) of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core gas path 40 of FIG. 1 reverses its directions (e.g., from a forward-to-aft direction to an aft-to-forward direction) a first time as the gas path 40 extends from a combustor plenum 58 surrounding the combustor 50 into the combustion chamber 52. The core gas path 40 of FIG. 1 then reverses its direction (e.g., from the aft-to-forward direction to the forward-to-aft direction) a second time as the gas path 40 extends from the combustion chamber 52 into the turbine section 32.

During operation, air enters the gas turbine engine 20 through the inlet section 36 and its engine inlet 24. The inlet section 36 directs this air from the engine inlet 24 into the core gas path 40 and the compressor section 28. The engine inlet 24 of FIG. 1 thereby forms a forward, upstream inlet to the core gas path 40 and the compressor section 28. The air within the core gas path 40 may be referred to as core air.

The core air is compressed by the compressor rotor 42 and directed through an annular diffuser 60 and the plenum 58 into the combustion chamber 52. Fuel is injected and mixed with the compressed core air to provide a fuel-air mixture. This fuel-air mixture is ignited within the combustion chamber 52, and combustion products thereof flow through the turbine section 32 and cause the turbine rotor 44 to rotate. This rotation of the turbine rotor 44 drives rotation of the compressor rotor 42 and, thus, compression of the air received from the engine inlet 24. The exhaust section 38 receives the combustion products from the turbine section 32. The exhaust section 38 directs the received combustion products out of the gas turbine engine 20 to provide forward engine thrust.

The stationary engine structure 34 of FIG. 1 may include some or all stationary engine components included in the gas turbine engine 20. Herein, the term stationary may describe a component that does not rotate with the rotating assembly (e.g., an assembly of the rotors 42 and 44 and the shaft 46) during gas turbine engine operation. A stationary component, for example, may refer to any component that remains stationary during gas turbine engine operation such as, but not limited to, a wall, a liner, a strut, a fixed vane, a fuel nozzle, a conduit, etc.

Figure 2:
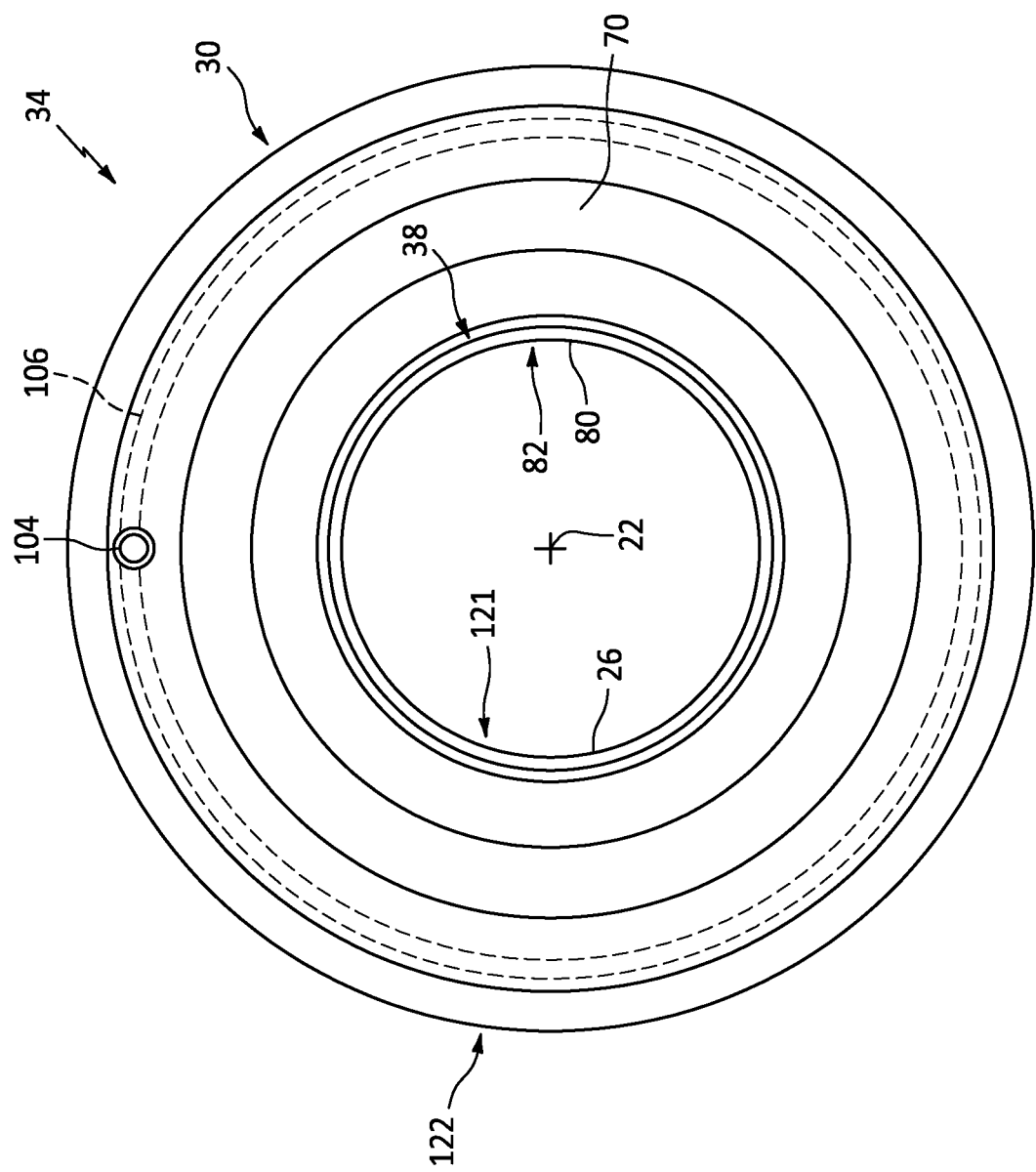
FIG. 2 is an aft end view illustration of a stationary engine structure for the gas turbine engine.

The stationary engine structure 34 of FIG. 1 is configured as a generally tubular structure. The stationary engine structure 34, for example, extends axially along the axial centerline 22 from the inlet section 36 to the engine section 38. The stationary engine structure 34 extends circumferentially about (e.g., completely around) the axial centerline 22 such that the stationary engine structure 34 has, for example, a full hoop geometry; see also FIG. 2.

Figure 3:
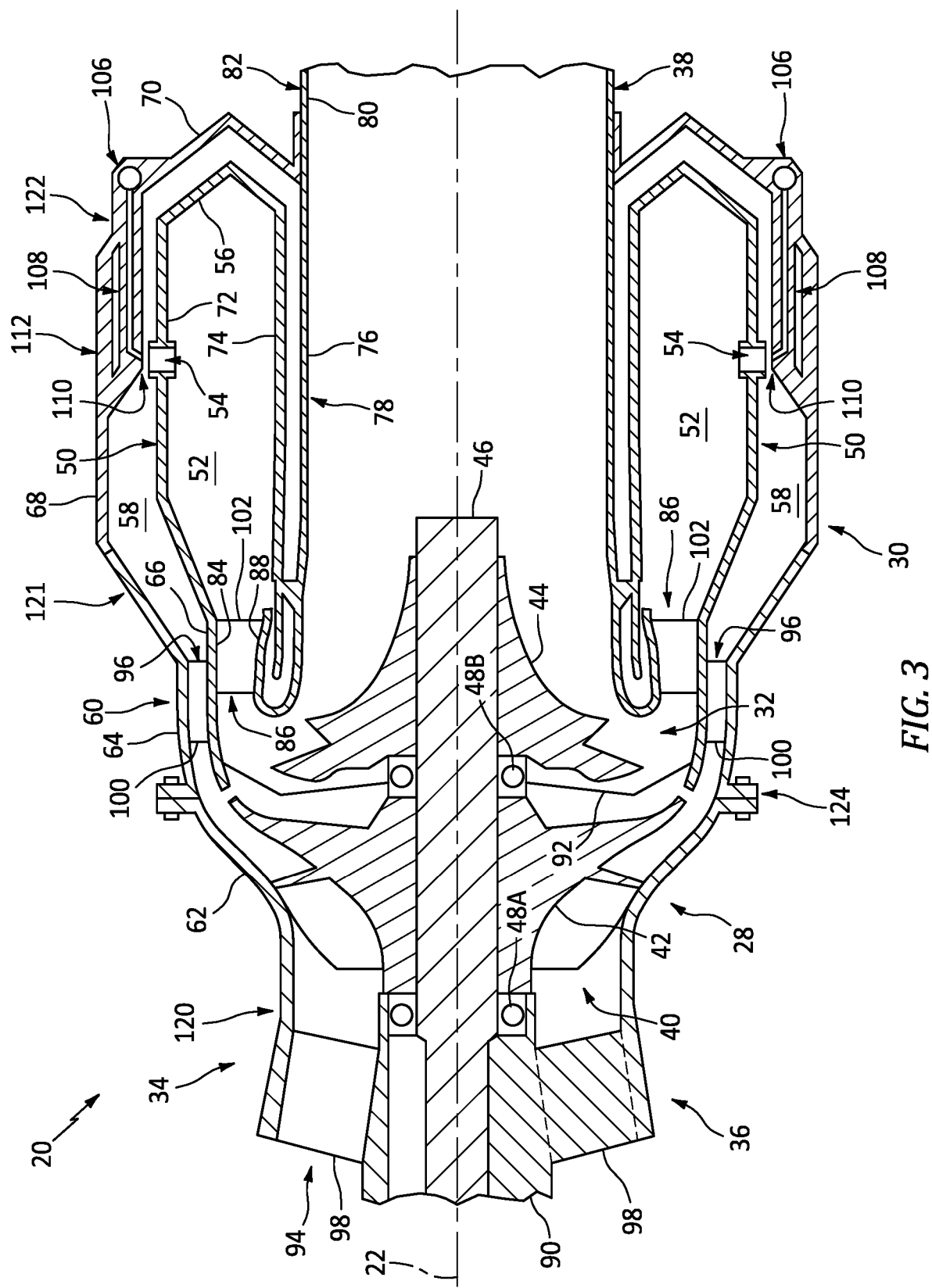
FIG. 3 is a schematic side sectional illustration of a central portion of the gas turbine engine.

The stationary engine structure 34 includes one or more case walls. The stationary engine structure 34 of FIG. 3, for example, includes an outer compressor wall 62, an outer diffuser wall 64 of the diffuser 60, an inner diffuser wall 66 of the diffuser 60, a plenum side (e.g., outer) wall 68, a plenum end wall 70, an outer combustor wall 72 of the combustor 50, an inner combustor wall 74 of the combustor 50, the bulkhead wall 56 of the combustor 50, an inner turbine wall 76 of a turbine duct 78, and an exhaust wall 80 of an exhaust duct 82 (see also FIG. 1). At least a portion or an entirety of each of the case walls 62, 64, 66, 68, 72, 74, 76 and/or 80 of FIG. 3, for example, is generally tubular. At least a portion or an entirety of each of the case walls 56 and/or 70 of FIG. 3 is generally annular.

The compressor wall 62 extends axially along the axial centerline 22 between and is connected to the inlet section 36 and the outer diffuser wall 64. The compressor wall 62 of FIG. 3 circumscribes, axially overlaps and thereby houses the compressor rotor 42.

The outer diffuser wall 64 extends axially along the axial centerline 22 between and is connected to the compressor wall 62 and the plenum side wall 68. The outer diffuser wall 64 is spaced radially outboard from, axially overlaps and circumscribes the inner diffuser wall 66. The outer diffuser wall 64 of FIG. 3 thereby forms an outer peripheral boundary of the core gas path 40 through the diffuser 60.

The inner diffuser wall 66 may be connected to outer combustor wall 72. The inner diffuser wall 66 of FIG. 3, for example, projects axially out from the outer combustor wall 72 and extends axially towards (e.g., to) an aft, downstream end of an inner platform of the compressor rotor 42. This inner diffuser wall 66 forms an inner peripheral boundary of the core gas path 40 within the diffuser 60. The inner diffuser wall 66 may also be configured as an outer turbine wall. The inner diffuser wall 66 of FIG. 3, for example, may also form an outer peripheral boundary of the core gas path 40 within a (e.g., upstream) portion of the turbine section 32. The inner diffuser wall 66 of FIG. 3 circumscribes, axially overlaps and may thereby house a (e.g., upstream) portion of the turbine rotor 44.

The plenum side wall 68 extends axially along the axial centerline 22 between and is connected to the outer diffuser wall 64 and the plenum end wall 70. The plenum side wall 68 of FIG. 3 circumscribes, axially overlaps and thereby houses the combustor 50 and its outer combustor wall 72. The plenum side wall 68 is radially spaced outward from the combustor 50 and its outer combustor wall 72. The plenum side wall 68 forms an outer peripheral boundary of the plenum 58.

The plenum end wall 70 extends radially (and axially along the axial centerline 22) between and is connected to the plenum side wall 68 and the exhaust wall 80. The plenum end wall 70 is axially spaced from the combustor 50 and its bulkhead wall 56. The plenum end wall 70 forms an axial end peripheral boundary of the plenum 58.

The outer combustor wall 72 extends axially along the axial centerline 22 between and may be connected to the bulkhead wall 56 and the inner diffuser wall 66. More particularly, the outer combustor wall 72 extends axially to and may be connected to an outer platform 84 of a turbine nozzle 86; e.g., an exit nozzle from the combustion chamber 52. This nozzle outer platform 84 of FIG. 3 is configured as part of the inner diffuser wall 66; however, the walls 66 and 84 may be discrete from one another in alternative embodiments.

The inner combustor wall 74 is connected to the bulkhead wall 56. This inner combustor wall 74 projects axially along the axial centerline 22 out from the bulkhead wall 56 towards the turbine nozzle 86 and its inner platform 88. This nozzle inner platform 88 of FIG. 3 is configured as part of the inner turbine wall 76; however, the walls 76 and 88 may be discrete from one another in alternative embodiments.

The bulkhead wall 56 extends radially between the outer combustor wall 72 and the inner combustor wall 74. The bulkhead wall 56 is connected to an aft end portion of the outer combustor wall 72 and an aft end portion of the inner combustor wall 74. With this arrangement, the combustor case walls 56, 72 and 74 collectively form peripheral boundaries of the combustion chamber 52 within the combustor 50.

The inner turbine wall 76 may be wrapped around a downstream end portion of the inner combustor wall 74. An upstream portion of the inner turbine wall 76 of FIG. 3 (e.g., the inner platform 88), for example, circumscribes and axially overlaps the downstream end portion of the inner combustor wall 74. This upstream portion extends axially along the axial centerline 22 (in the aft-to-forward direction) to a turning portion of the inner turbine wall 76. A downstream portion of the inner turbine wall 76 projects axially (in the forward-to-aft direction) away from the inner turbine wall turning portion to the exhaust wall 80. The inner turbine wall 76 is circumscribed and axially overlapped by the combustor 50 and its inner combustor wall 74. The inner turbine wall 76 is also spaced radially inboard from the combustor 50 and its inner combustor wall 74. The inner turbine wall 76 of FIG. 3 forms an inner peripheral boundary of the plenum 58, where the combustor 50 is disposed within and is substantially surrounded by the plenum 58. The inner turbine wall 76 forms an outer peripheral boundary of the core gas path 40 within a (e.g., downstream) portion of the turbine section 32. The inner turbine wall 76 of FIG. 3 also circumscribes, axially overlaps and thereby houses a (e.g., downstream) portion of the turbine rotor 44.

The exhaust wall 80 is connected to the inner turbine wall 76. The exhaust wall 80 of FIG. 1 projects axially out from the inner turbine wall 76 to the aft engine exhaust 26.

The stationary engine structure 34 may include one or more internal support structures with one or more support members. Examples of the support members include, but are not limited to, struts, structural guide vanes, bearing supports, bearing compartment walls, etc. The stationary engine structure 34 of FIG. 3, for example, includes a forward support structure 90 to support the forward bearing 48A and an aft support structure 92 to support the aft bearing 48B. The stationary engine structure 34 of FIG. 3 also includes an inlet nozzle 94, a diffuser nozzle 96 and the turbine nozzle 86.

The inlet nozzle 94 may be configured to condition the core air entering the compressor section 28. The inlet nozzle 94 of FIG. 3, for example, includes one or more inlet guide vanes 98 configured to impart swirl to the core air. These inlet guide vanes 98 are arranged circumferentially about the axial centerline 22 in an annular array. Each of the inlet guide vanes 98 extends radially across the gas path 40.

The diffuser nozzle 96 may be configured to condition the core air leaving the compressor section 28 and entering the plenum 58. The diffuser nozzle 96 of FIG. 3, for example, includes one or more diffuser guide vanes 100 configured to impart swirl to the core air. These diffuser guide vanes 100 are arranged circumferentially about the axial centerline 22 in an annular array. Each of the diffuser guide vanes 100 extends radially across the gas path 40. More particularly, each of the diffuser guide vanes 100 extends radially between and is connected to the inner diffuser wall 66 and the outer diffuser wall 64.

The turbine nozzle 86 may be configured to condition the combustion products exiting the combustor 50 and its combustion chamber 52. The turbine nozzle 86 of FIG. 3, for example, includes one or more turbine guide vanes 102 configured to impart swirl to the combustion products. These turbine guide vanes 102 are arranged circumferentially about the axial centerline 22 in an annular array. Each of the turbine guide vanes 102 extends radially across the gas path 40. More particularly, each of the turbine guide vanes 102 extends radially between and is connected to the turbine nozzle outer and inner platforms 84 and 88.

Figure 4:
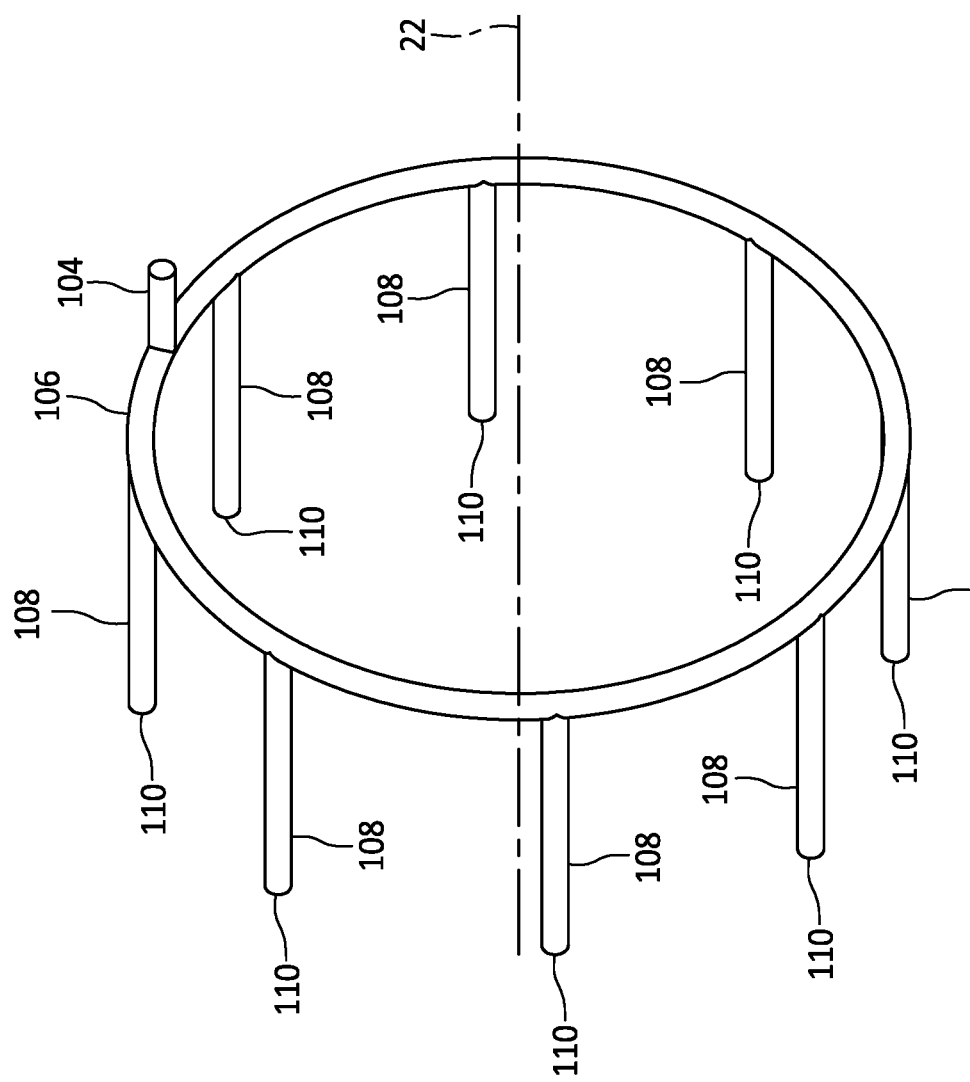
FIG. 4 is a schematic perspective illustration of a portion of a fuel delivery system.
Figure 5:
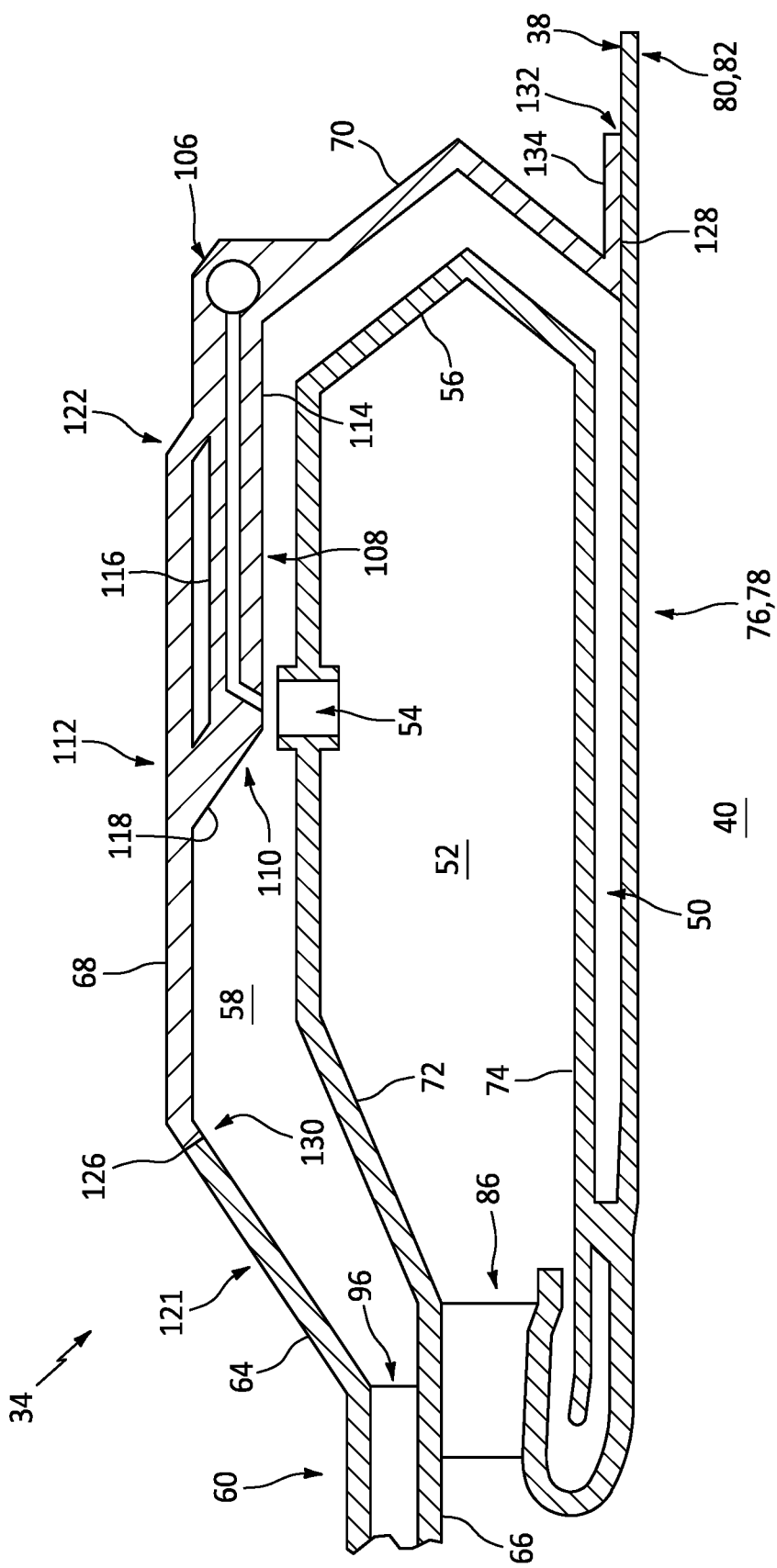
FIG. 5 is a partial side sectional illustration of an outer section of the stationary engine structure bonded to an inner section of the stationary engine structure.

Referring to FIG. 4, the stationary engine structure 34 may also include one or more components of a fuel delivery system. These fuel delivery system components may include a fuel feed line 104 (e.g., an inlet conduit), a fuel manifold 106, one or more fuel conduits 108 and one or more fuel injectors 110. The fuel manifold 106 is configured to supply fuel received from a fuel source (e.g., a fuel reservoir, a fuel pump, etc.) through the fuel feed line 104 to the fuel conduits 108, which fuel conduits 108 may be fluidly coupled to the fuel manifold 106 in parallel. Referring to FIG. 5, each of the fuel conduits 108 is configured to direct the fuel received from the fuel manifold 106 to a respective one of the fuel injectors 110. Each of the fuel injectors 110 is configured to direct (e.g., inject) the fuel received from the respective fuel conduit 108 into a respective volume of the combustor 50 for subsequent combustion within the combustion chamber 52. The combustor volume may be a respective one of the ports 54 in a sidewall of the combustor 50 (e.g., the outer combustor wall 72), where the port 54 may be configured as a dilution chute, a flow guide, an orifice or any other opening and/or passage through the combustor sidewall and into the combustion chamber 52.

The fuel manifold 106 of FIG. 4 extends circumferentially about (e.g., completely around) the axial centerline 22. Referring to FIG. 5, the fuel manifold 106 is arranged at an exterior of an outer engine case 112 (e.g., a plenum case, a combustor section case, etc.) of the stationary engine structure 34, which outer engine case 112 may include the plenum side wall 68 and the plenum end wall 70. An entirety of the fuel manifold 106, for example, may be located outside of the plenum 58 and, more generally, outside of the engine case 112 and its plenum end wall 70. The fuel manifold 106 is connected to and extends longitudinally (e.g., in a circumferential direction; see FIG. 4) along the engine case 112.

The fuel conduits 108 of FIG. 4 are distributed circumferentially about the axial centerline 22 in an annular array. Each of these fuel conduits 108 extends longitudinally between and is fluidly coupled to the fuel manifold 106 and a respective one of the fuel injectors 110. Referring to FIG. 5, each fuel conduit 108 is arranged at an interior of the engine case 112. Each fuel conduit 108 of FIG. 5, for example, is connected to the engine case 112 and its plenum end wall 70. Each fuel conduit 108 projects (e.g., axially) out from the engine case 112 and its plenum end wall 70 into the plenum 58 towards (e.g., to) the respective fuel injector 110. A first (e.g., upstream) segment 114 of each fuel conduit 108 of FIG. 5 extends axially along and may be integral with the engine case 112 and one or more of its walls 68 and/or 70; e.g., the plenum end wall 70. A second (e.g., downstream) segment 116 of each fuel conduit 108 of FIG. 5 projects axially out from the conduit first segment 114, away from the engine case 112, towards (e.g., to) the respective fuel injector 110. This conduit second segment 116 is radially spaced (e.g., separated) from the engine case 112 and one or more of its walls 68 and/or 70; e.g., the plenum side wall 68. A distal end of each fuel conduit 108 and/or each fuel injector 110, however, may be structurally supported within the plenum 58 by a support 118; e.g., a strut, a vane, a post, a beam, etc. This support 118 is configured to maintain a position of the fuel injector 110 during gas turbine engine operation. Without the support 118, for example, thermal expansion and/or contraction of the fuel conduit 108 may lead to (e.g., axial and/or circumferential) misalignment of the respective fuel injector 110 and port 54; e.g., dilution chute. Of course, in other embodiments, an entirety of one or more or all of the fuel conduits 108 may each be formed integral with the engine case 112 to obviate the need for the respective support 118.

The fuel injectors 110 of FIG. 4 are distributed circumferentially about the axial centerline 22 in an annular array. Each of these fuel injectors 110 is fluidly coupled with a respective one of the fuel conduits 108. Referring to FIG. 5, each of the fuel injectors 110 is (e.g., circumferentially and/or axially) aligned with and located next to the respective port 54; e.g., dilution chute. Each fuel injector 110 is disposed at a distal end of the respective fuel conduit 108, and is formed integral with the respective fuel conduit 108 and support 118. Each fuel injector 110, for example, may be configured as a nozzle (e.g., an outlet orifice) in a sidewall of the respective fuel conduit 108. Alternatively, one or more of the fuel injectors 110 may be formed discrete from the respective fuel conduit 108.

The stationary engine structure 34 of FIG. 3 is configured from a plurality of discrete sections of the engine structure 34; e.g., engine sub-structures. The stationary engine structure 34 of FIG. 3, for example, at least or only includes an upstream section 120, an inner downstream section 121 and an outer downstream section 122. The upstream section 120 may include an entirety (or at least a portion) of any one or more or all of the engine structure elements 36, 62, 90, 94 and 98. The inner downstream section 121 may include an entirety (or at least a portion) of any one or more or all of the engine structure elements 50, 56, 64, 66, 72, 74, 76, 78, 80, 82, 84, 86, 88, 92, 96, 100, 102; see also FIG. 1. The outer downstream section 122 may include an entirety (or at least a portion) of any one or more or all of the engine structure elements 68, 70, 104 (see FIGS. 2 and 4), 106, 108, 110, 112, 114, 116, 118 and 134. With such an arrangement, the stationary engine structure 34 may be configured from (include) relatively few discrete parts (e.g., discretely formed bodies) while still facilitating inspection and/or finishing (e.g., machining, coating, etc.) interior surfaces of the stationary engine structure 34. For example, forming the downstream sections 121 and 122 discrete from one another facilitates inspection and/or finishing of the fuel injectors 110 and their orifices, inspection and/or finishing of the ports 54 (e.g., dilution chutes), etc.

Each of the engine structure sections 120-122 may be formed as a monolithic body. Herein, the term monolithic may described an apparatus which is formed as a single unitary body. Each engine structure section 120, 121, 122, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

The upstream section 120 is mated with and connected to a forward, upstream end of the inner downstream section 121. The upstream section 120 of FIG. 3, for example, is attached to the inner downstream section 121 via at least one mechanical joint 124; e.g., a bolted flange connection. However, in other embodiments, the upstream section 120 may also or alternatively be attached to the inner downstream section 121 via at least one bonded joint; e.g., a brazed connection, a welded connection, etc.

The outer downstream section 122 is mated with and connected to the inner downstream section 121. The inner downstream section 121 of FIG. 5, for example, is received within a bore of the outer downstream section 122, where the outer downstream section 122 and its engine case 112 circumscribe and axially overlap the combustor 50 and the exhaust duct 82. The outer downstream section 122 is connected to the inner downstream section 121 at a forward axial end 126 of the engine case 112 and a radial inner end 128 of the engine case 112. The plenum side wall 68 of FIG. 5, for example, is brazed, welded and/or otherwise bonded to the outer diffuser wall 64 at an (e.g., annular) axial interface 130; e.g., a butt joint. An annular end (e.g., edge) of the plenum side wall 68 of FIG. 5, for example, is aligned with and axially engages (e.g., via bonding material such as braze material) an annular end (e.g., edge) of the outer diffuser wall 64. The plenum end wall 70 of FIG. 5 is brazed, welded and/or otherwise bonded to the exhaust duct 82 and its exhaust wall 80 (and/or the turbine duct 78 and its inner turbine wall 76) at a (e.g., tubular) radial interface 132; e.g., a splice joint such as an overlap joint. The engine case 112 of FIG. 5, for example, includes a tubular flange 134 that projects axially (e.g., in an aft, downstream direction) out from the plenum end wall 70 at the radial inner end 128 to an axial distal end. An inner surface of this tubular flange 134 circumscribes, axially overlaps and radially engages (e.g., via bonding material such as braze material) an outer surface of the exhaust duct 82 and its exhaust wall 80 (and/or the turbine duct 78 and its inner turbine wall 76).

The axial interface 130 and/or the radial interface 132 may be positioned relatively far from one or more of the fuel delivery system components. The axial interface 130 of FIG. 5, for example, is located at (e.g., on, adjacent or proximate) the diffuser 60 and an outlet from the combustor 50. The radial interface 132 of FIG. 5 is located at (e.g., on, adjacent or proximate) the exhaust duct 82 (and/or the turbine duct 78) and a radial inner side of the combustor 50. With this arrangement, heat transferred into the outer downstream section 122 and its engine case 112 during bonding of the engine structure sections 121 and 122 may significantly dissipate prior to reaching the fuel delivery system components 108 and/or 110. The fuel delivery system components 108 and/or 110 may therefore be subject to very little or no thermal distortion during the bonding of the engine structure sections 121 and 122. The fuel injectors 110 may thereby remain properly positioned relative to (e.g., aligned with) the respective ports 54. By contrast, if the interfaces 130 and 132 are positioned too close to (e.g., next to) the fuel delivery system components 108 and/or 110, the fuel delivery system components 108 and/or 110 may be subject to thermal distortion during bonding and the fuel injectors 110 may become misaligned with (e.g., offset from) the respective ports 54.

Figure 6:
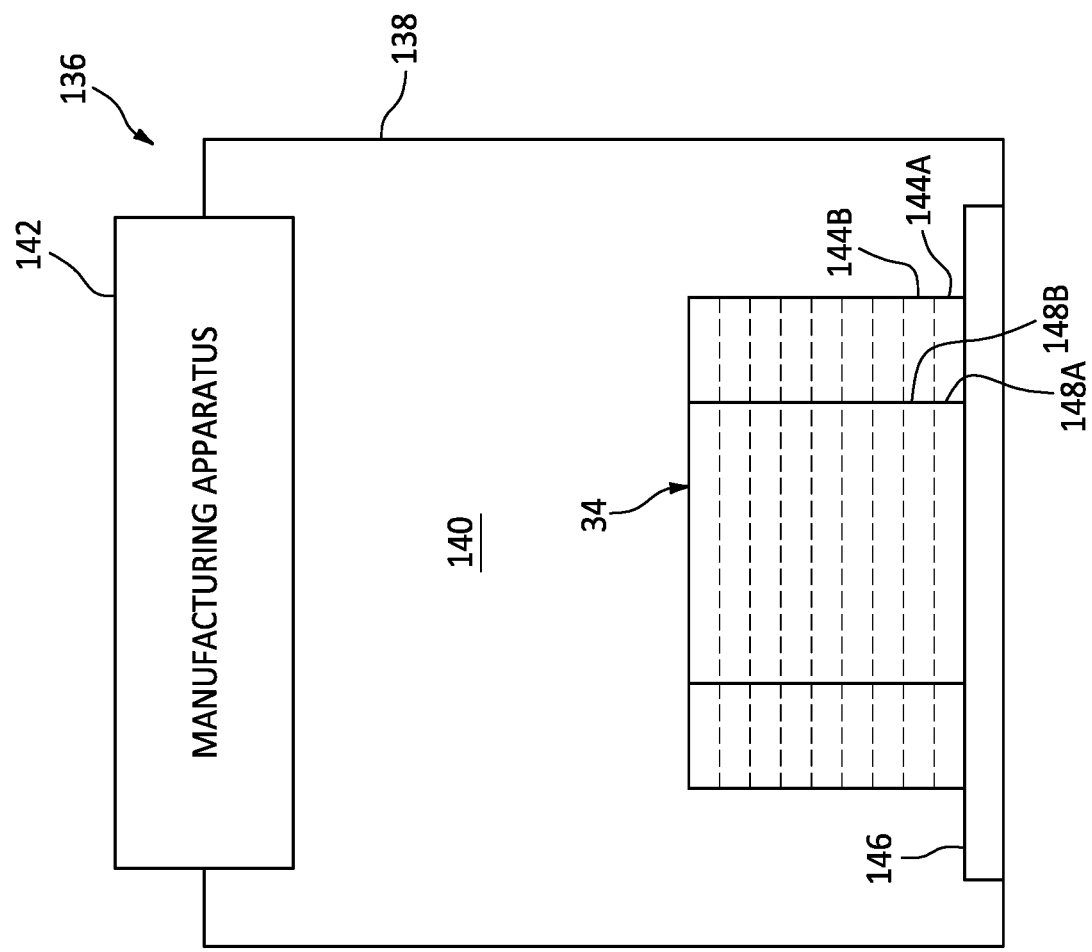
FIG. 6 is a schematic illustration of a manufacturing system.

FIG. 6 illustrates a system 136 for manufacturing a stationary engine structure such as, but not limited to, the stationary engine structure 34 of FIG. 1. This manufacturing system 136 (e.g., an additive manufacturing system) includes a build chamber 138 defining a build space 140 for manufacturing the stationary engine structure 34 (or one or more of its components). The manufacturing system 136 also includes an additive manufacturing apparatus 142; e.g., a laser powder bed fusion (LPBF) apparatus.

The additive manufacturing apparatus 142 is configured to build the stationary engine structure 34 (or one or more of its components) or a preform thereof within the build space 140 in a layer-by-layer fashion. For example, the additive manufacturing apparatus 142 may deposit a first layer 144A of powder over a support surface 146 within the build space 140. The additive manufacturing apparatus 142 may thereafter selectively solidify (e.g., sinter) a select portion of the first layer 144A of powder to form a first portion 148A (e.g., layer, slice) of the stationary engine structure 34 (or one or more of its components) or a preform thereof. The additive manufacturing apparatus 142 may deposit a second layer 144B of powder within the build space 140 over the first layer 144A of at least partially solidified powder. The additive manufacturing apparatus 142 may thereafter selectively solidify a select portion of the second layer 144B of powder with the previously solidified first portion 148A to form a second portion 148B (e.g., layer, slice) of the stationary engine structure 34 (or one or more of its components) or a preform thereof. This process may be repeated until the entire stationary engine structure 34 (or one or more of its components) or a preform thereof is formed.

While the additive manufacturing apparatus 142 is described above as a laser powder bed fusion (LPBF) apparatus, the present disclosure is not limited thereto. The additive manufacturing apparatus 142, for example, may alternatively be configured as a stereolithography (SLA) apparatus, a direct selective laser sintering (DSLS) apparatus, an electron beam sintering (EBS) apparatus, an electron beam melting (EBM) apparatus, a laser engineered net shaping (LENS) apparatus, a laser net shape manufacturing (LNSM) apparatus, a direct metal deposition (DMD) apparatus or a direct metal laser sintering (DMLS) apparatus.

Figure 7:
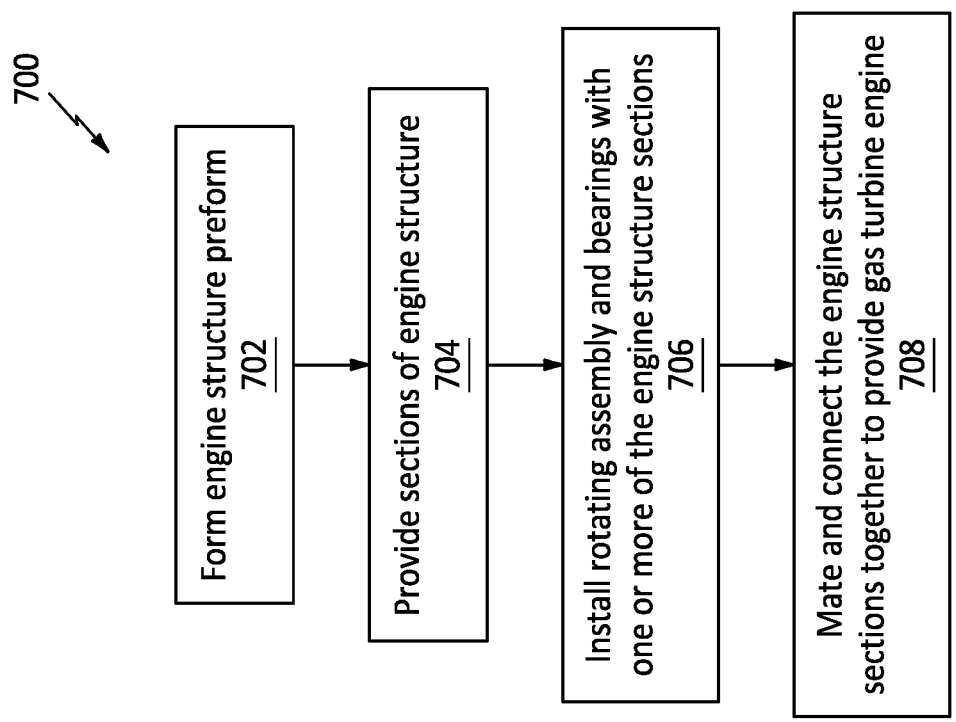
FIG. 7 is a flow diagram of a method for forming a gas turbine engine.

FIG. 7 is a flow diagram of a method 700 for manufacturing an engine such as, but not limited to, the gas turbine engine 20 (or one or more of its components) of FIG. 1. This method 700 may be performed using a manufacturing system such as, but not limited to, the manufacturing system 136 of FIG. 6.

In step 702, a stationary engine structure preform 150 is formed. An example of the stationary engine structure preform 150 is schematically shown in FIGS. 8A and 8B. This stationary engine structure preform 150 includes a plurality of engine structure section preforms such as, for example, an upstream section preform 152, an inner downstream section preform 153 and an outer downstream section 154 preform.

Herein, the term preform may describe a body having at least a basic configuration (e.g., shape, size, features, etc.) of a part to be formed. For example, the upstream section preform 152 may generally have the same configuration as the upstream section 120 to be formed (see FIGS. 1 and 3). The inner downstream section preform 153 may generally have the same configuration as the inner downstream section 121 to be formed (see FIGS. 1 and 3). The outer downstream section preform 154 may generally have the same configuration as the outer downstream section 122 to be formed (see FIGS. 3 and 5). However, one or more of these engine structure section preforms 152-154 may each include one or more build features, one or more unfinished surfaces, etc. The build features (e.g., webs, ribs, spares, etc.) may be included in order to support the respective preform during the formation step 702. These build features, however, are removed (e.g., via machining) after the formation step 702 to provide the respective engine structure section 120, 121, 122. In addition or alternatively, one or more surfaces, features (e.g., apertures, bosses, mounting features), etc. of the engine structure section preform may be machined (e.g., refined, smoothed, drilled, etc.) to provide the respective engine structure section 120, 121, 122. Generally speaking, no additional material will need to be added to engine structure section preforms 120-122 to provide the respective engine structure sections 120-122 following the formation step 702.

The stationary engine structure preform 150 may be completely formed within the build space 140 of the additive manufacturing apparatus 142. The entire stationary engine structure preform 150 including its section preforms 152-154, for example, may be additively manufactured concurrently using a layer-by-layer method within the build space 140. Referring to FIG. 8A, the engine structure section preforms 152-154 may be formed as discrete (e.g., separate, distinct, unattached, etc.) bodies. Each engine structure section preform 152, 153, 154, for example, may be separated from each adjacent engine structure section preform 152, 153, 154 by a gap. Alternatively, referring to FIG. 8B, one or more or all of the engine structure section preforms 152-154 may each be formed integral with and thereby connected to one or more or all of the other engine structure section preforms 152-154. Each engine structure section preform 152, 153, 154 of FIG. 8B, for example, is connected to the adjacent engine structure section preform(s) 152, 153, 154 by an intermediate structure 156A, 156B (generally referred to as 156); e.g., a tie, a support, a bridge, etc.

While the section preforms 152-154 of the stationary engine structure preform 150 are described above as being formed concurrently within the build space 140, the present disclosure is not limited thereto. For example, in other embodiments, each of the section preforms 152-154 (or select ones of the preforms) may be formed within the build space 140 separately from another one or more of the section preforms 152-154. Furthermore, while the formation step 702 is described above in relation to additively manufacturing, the present disclosure is not limited thereto. For example, in other embodiments, one or more or each of the section preforms 152-154 may also or alternatively be formed using casting, machining and/or various other manufacturing techniques.

In step 704, the stationary engine structure 34 and its engine structure sections 120-122 are provided. For example, the various preforms are removed from the build space 140 of the manufacturing system 136. In addition (before or after being removed from the build space 140), one or more of the following operations may be performed:

One or more or each of the engine structure section preforms 152-154 may be de-powdered. For example, any remaining, un-solidified powder trapped with a respective preform may be removed (e.g., evacuated) from that preform.

The engine structure section preforms 152-154 may be separated from one another where, for example, the preforms are connected together as shown in FIG. 8B. For example, the intermediate structures 156A and/or 156B of FIG. 8B may be cut off and/or ground down to separate the engine structure section preforms.

Any build features may be removed from one or more or each of the engine structure section preforms 152-154.

One or more surfaces, one or more features, etc. of one or more of the engine structure section preforms 152-154 may be machined, surface treated, heat treated, etc.

One or more surfaces of one or more of the engine structure section preforms 152-154 may be cleaned.

One or more surfaces of one or more of the engine structure section preforms 152-154 may be coated.

By performing one or more of the above operations and/or other (e.g., finishing) operations, the engine structure section preforms 152-154 may be turned into their respective engine structure sections 120-122.

In step 706, the rotating assembly of the elements 42, 44 and 46 and the bearings 48 are installed with one or more of the engine structure sections 120 and/or 121.

In step 708, the engine structure sections 120-122 are mated and connected to provide the stationary engine structure 34 and, more generally, the gas turbine engine 20. The upstream section 120, for example, is axially abutted against and attached (e.g., mechanically fastened) to the inner downstream section 121. The inner downstream section 121 is nested within the outer downstream section 122, and the outer downstream section 122 is attached (e.g., bonded) to the inner downstream section 121.

The gas turbine engine 20 is described above as a single spool, radial-flow turbojet turbine engine for ease of description. The present disclosure, however, is not limited to such an exemplary gas turbine engine. The gas turbine engine 20, for example, may alternatively be configured as an axial flow gas turbine engine. The gas turbine engine 20 may be configured as a direct drive gas turbine engine. The gas turbine engine 20 may alternatively include a gear train that connects one or more rotors together such that the rotors rotate at different speeds. The gas turbine engine 20 may be configured with a single spool (e.g., see FIG. 1), two spools, or with more than two spools. The gas turbine engine 20 may be configured as a turbofan engine, a turbojet engine, a propfan engine, a pusher fan engine or any other type of turbine engine. In addition, while the gas turbine engine 20 is described above with an exemplary reverser flow annular combustor, the gas turbine engine 20 may also or alternatively include any other type/configuration of annular, tubular (e.g., CAN), axial flow and/or reverser flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a stationary engine structure including a diffuser, a combustor, an engine case and a plenum, the combustor disposed within the plenum, the engine case forming a peripheral boundary of the plenum, and a gas path extending sequentially through the diffuser, the plenum and the combustor;
a first section of the stationary engine structure formed as a first monolithic body, the first section including the diffuser and the combustor; and
a second section of the stationary structure formed as a second monolithic body, the second section comprising the engine case;
wherein the second section circumscribes the first section.

2. The assembly of claim 1, wherein
the diffuser includes a first wall, a second wall and a plurality of vanes; and each of the plurality of vanes is within the gas path and extends between the first wall and the second wall.

3. The assembly of claim 1, wherein the combustor is configured as a reverse-flow combustor.

4. The assembly of claim 1, wherein
the stationary engine structure further includes a turbine nozzle downstream of the combustor along the gas path; and
the first section further includes the turbine nozzle.

5. The assembly of claim 4, wherein the diffuser and the turbine nozzle share a common wall.

6. The assembly of claim 4, wherein
the turbine nozzle includes a first wall, a second wall and a plurality of vanes; and
each of the plurality of vanes is within the gas path and extends between the first wall and the second wall.

7. The assembly of claim 1, further comprising:
a turbine rotor;
the stationary engine structure further including a turbine case housing the turbine rotor and forming a peripheral boundary of the gas path; and
the first section further including the turbine case.

8. The assembly of claim 1, wherein
the stationary engine structure further includes an exhaust duct forming a peripheral boundary of the gas path; and
the first section further including the exhaust duct.

9. The assembly of claim 1, wherein the second section is bonded to the first section through a butt joint.

10. The assembly of claim 1, wherein the second section is bonded to the first section through a splice joint.

11. The assembly of claim 1, wherein
the engine case extends axially along and circumferentially about an axis, and the engine case includes a side wall and an end wall;
the side wall projects axially out from the end wall to an axial end of the engine case, and the engine case is attached to the first section at the axial end; and
the end wall projects radially in from the side wall to a radial end of the engine case, and the engine case is attached to the first section at the radial end.

12. An assembly for a gas turbine engine, comprising:
a stationary engine structure including a diffuser, a combustor, an engine case and a plenum, the combustor disposed within the plenum, the engine case forming a peripheral boundary of the plenum, and a gas path extending sequentially through the diffuser, the plenum and the combustor;
a first section of the stationary engine structure formed as a first monolithic body, the first section including the diffuser and the combustor; and
a second section of the stationary structure formed as a second monolithic body, the second section comprising the engine case;
wherein the stationary engine structure further includes a fuel conduit and a nozzle;
wherein the nozzle is configured to receive fuel from the fuel conduit and inject the fuel into a volume of the combustor; and
wherein the second section further includes at least one of the fuel conduit or the nozzle.

13. The assembly of claim 12, wherein
the stationary structure further includes a fuel manifold outside of the engine case;
the fuel manifold is configured to supply the fuel to the fuel conduit; and
the second section further includes the fuel manifold.

14. The assembly of claim 12, wherein at least a portion of the fuel conduit projects out from the engine case into the plenum towards the fuel injector.

15. An assembly for a gas turbine engine, comprising:
a stationary engine structure including a diffuser, a combustor, an engine case and a plenum, the combustor disposed within the plenum, the engine case forming a peripheral boundary of the plenum, and a gas path extending sequentially through the diffuser, the plenum and the combustor;
a first section of the stationary engine structure formed as a first monolithic body, the first section including the diffuser and the combustor; and
a second section of the stationary structure formed as a second monolithic body, the second section comprising the engine case;
wherein the stationary engine structure further includes an inlet section and a compressor case;
wherein the compressor case forms a peripheral boundary of the gas path between the inlet section and the diffuser; and
wherein a third section of the stationary structure includes the inlet section and the compressor case, and the third section is attached to the first section.

16. An assembly for a gas turbine engine, comprising:
a diffuser including an inner diffuser wall and an outer diffuser wall;
a combustor including an inner combustor wall, an outer combustor wall and a bulkhead extending between and connected to the inner combustor wall and the outer combustor wall;
a duct wall;
an engine wall including a side wall and an end wall, the side wall projecting out from the end wall to the outer diffuser wall, the side wall brazed to the outer diffuser wall, the end wall projecting out from the side wall to the duct wall, and the end wall brazed to the duct wall; and
a monolithic body including the diffuser, the combustor and the duct wall.

* * * * *